United States Patent

Walker et al.

[15] 3,703,781

[45] Nov. 28, 1972

[54] FISHING DEVICE

[72] Inventors: Bobby T. Walker, Route 3, Box 356, Monroe, La. 71201; Vincent F. Danna, Route 2, Box 442-A, West Monroe, La. 71291

[22] Filed: Dec. 11, 1970

[21] Appl. No.: 97,198

[52] U.S. Cl. ..................................43/16, 43/17.5
[51] Int. Cl. ...............................A01k 97/12
[58] Field of Search....................43/16, 15

[56] References Cited

UNITED STATES PATENTS

| | | | |
|---|---|---|---|
| 2,824,403 | 2/1958 | Booth | 43/15 |
| 2,858,634 | 11/1958 | Bremer, Jr. | 43/15 |

FOREIGN PATENTS OR APPLICATIONS

| | | | |
|---|---|---|---|
| 1,097,052 | 2/1955 | France | 43/15 |
| 1,314,579 | 12/1962 | France | 43/15 |

Primary Examiner—Aldrich F. Medbery
Assistant Examiner—Daniel J. Leach
Attorney—Berman, Davidson & Berman

[57] ABSTRACT

A fishing device for setting a hook in a fish, playing the fish, and indicating that the fish has been hooked. The device comprises a shaft tapering at one end to a tip portion, and having connected thereto at its opposite end an elastic band having an unstretched length sufficient to reach the tip portion but being stretchable to engage the tip portion. A main fishing line is connected to the shaft at a point adjacent to the connection point of the elastic band but in closer proximity to the tip portion. A fish hook supporting line is connected to the elastic band at its tip-engaging portion. The elastic band when stretched to engage the top portion is releasable therefrom by a pull on the fish hook supporting line. When the device is triggered, the elastic band acts to set the hook in the fish and play the fish until retrieved by the fisherman, and the shaft swings backwards and forwards to act as an indicator to the fisherman that the fish has been hooked.

9 Claims, 10 Drawing Figures

PATENTED NOV 28 1972 3,703,781
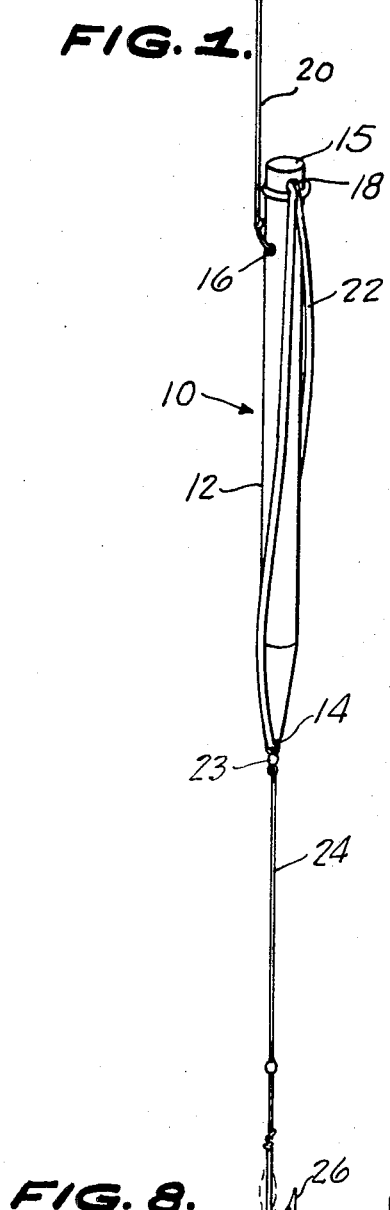
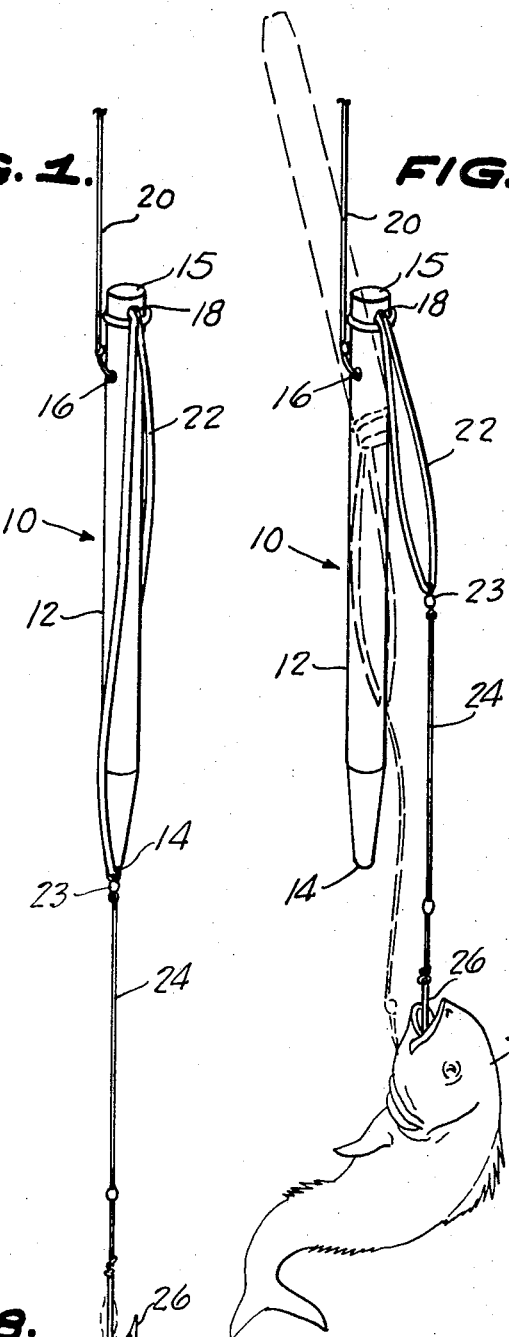
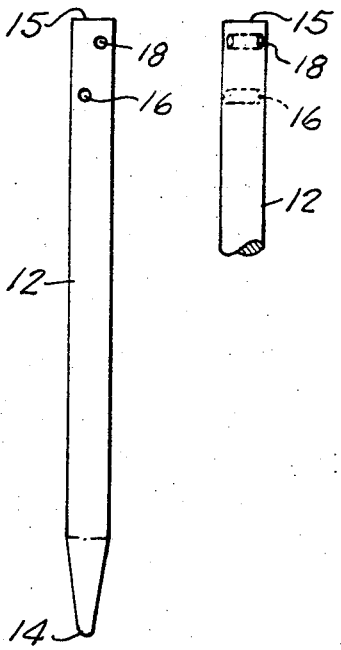
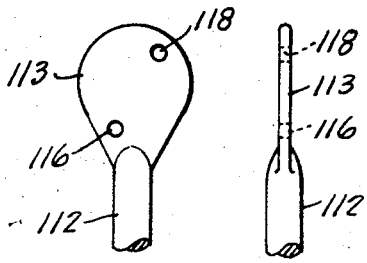
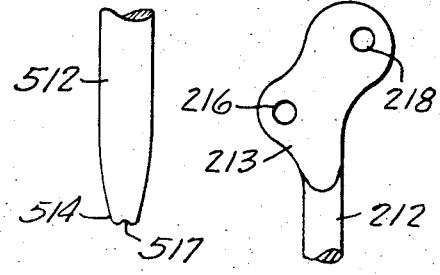
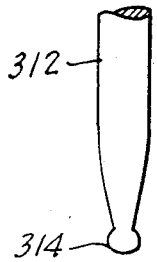
INVENTORS.
BOBBY T. WALKER,
VINCENT F. DANNA,
BY
Berman, Davidson & Berman,
ATTORNEYS.

FISHING DEVICE

The present invention relates to a fishing device and, more particularly, to a device for setting a hook in the fish, playing the fish until retrieved by the fisherman, and indicating to the fisherman that the fish has been hooked.

Various devices have previously been utilized for setting the hook in a fish's jaw when the bait has been seized. These devices have generally been spring operated with relatively complicated trigger mechanisms and, hence, have been relatively expensive to manufacture and difficult to repair. Also, such prior devices have lacked suitable means for giving the fisherman a readily apparent indication that the fish has been hooked.

It is, therefore, an object of the present invention to provide a fish hook setting device having a trigger mechanism which is simple in construction, easy to operate, and inexpensive to manufacture and repair.

Another object of the present invention is to provide a fish hook setting device of the type described above, which also allows for the playing of the fish until the fish is retrieved by the fisherman.

A further object of the present invention is to provide a fish hook setting device of the type described above, which further includes a readily apparent means for indicating to the fisherman that the fish has been hooked.

The device of the present invention comprises a shaft made from wood, plastic, rubber, or the like, and tapered at one end to a tip portion. At the opposite end of the shaft from the tip portion are two line connecting means, preferably in the form of axially spaced transverse apertures through the shaft. To the line connecting means in closer proximity to the tip portion is connected the main fishing line. The line connecting means further removed from the tip portion has connected thereto an elastic band having an unstretched length insufficient to reach the tip portion of the shaft, but being stretchable to engage the tip portion. A fish hook supporting line is connected to the elastic band at the portion thereof which engages the tip portion of the shaft. The device is set merely by stretching the elastic band into engagement with the tip portion of the shaft. Thereafter, a pull on the fish hook supporting line by the fish seizing the bait acts to trigger the device by releasing the elastic band from its engagement with the tip portion of the shaft. The sudden pull of the elastic band in returning toward its unstretched condition acts to quickly set the hook in the fish's jaw, and the elasticity of the band as it is being stretched by the fish pulling away and then being contracted back toward its unstretched condition, allows for the fish to be played until retrieved by the fisherman. Furthermore, the alternate stretching and contracting of the elastic band as the fish is being played transmits forces of alternating direction to the shaft at its point of attachment to the elastic band, thereby creating alternatingly directed moments around the point of attachment of the main fishing line to the shaft. This results in a vigorous swinging of the shaft backwards and forwards, thus acting as a readily apparent indicator to the fisherman that the fish has been hooked.

The above and other objects, features and advantages of the present invention will become more readily apparent from the following detailed description when considered in connection with the accompanying drawings, wherein like reference characters indicate like parts throughout the several FIGS. and in which:

FIG. 1 is a perspective view of the fish hook setting device of the present invention, shown in its set position ready to be put into the water;

FIG. 2 is a perspective view of the device of FIG. 1, shown after the device has been triggered by a fish, and showing the alternative movements of the device while the fish is being played;

FIG. 3 is an elevational view of the shaft of the device of FIGS. 1 and 2;

FIG. 4 is a fragmentary elevational view of the shaft of FIG. 3 turned 90° about its axis;

FIG. 5 is a fragmentary elevational view of a modified form of the shaft which can be used in accordance with the present invention;

FIG. 6 is a fragmentary elevational view of the shaft of FIG. 5 turned 90° about its axis;

FIG. 7 is a fragmentary elevation view of a modified form of the shaft of FIGS. 5 and 6;

FIG. 8 is a fragmentary elevational view showing a modified form of tip portion for the shaft of the device of the present invention;

FIG. 9 is a fragmentary elevational view showing another modified form of tip portion for the shaft of the device of the present invention; and FIG. 10 is a fragmentary elevational view showing still another modified form of tip portion for the shaft of the device of the present invention.

Referring to the drawings, the reference numeral 10 generally indicates the fish hook setting device of the present invention which includes a cylindrical shaft 12 having a tip portion 14 at its lower end. The shaft 12 may be made of wood, plastic, rubber, or the like. As shown in FIGS. 1 to 3, the tip portion 14 is tapered and rounded at its end. Adjacent to the opposite end 15 of the shaft 12 are two line connecting means in the form of apertures 16 and 18 extending transversely through the shaft 12. As shown, the apertures 16 and 18 are both axially and circumferentially spaced apart on the shaft 12, with the aperture 18 being further removed from the tip portion than the aperture 16. The preferred spacing of the two apertures is from 1 to 1 ½ inches apart. Connected to the lower aperture 16 is the main fishing line 20, the other end of which may be attached to a fishing pole, tree, limb, log, or the like, at the fisherman's discretion. Connected to the upper aperture 18 is an elastic band 22 having an unstretched length insufficient to reach the tip portion 14 of the shaft 12. In the preferred embodiment, the elastic band 22 extends unstretched a distance of approximately five-eighths of the distance from the aperture 18 to the end of the tip portion 14. The elastic band 22 is stretchable so as to be engageable with the tip portion 14 as shown in FIG. 1. Connected to the elastic band 22 at its tip engaging portion 23 is a hook supporting line 24, to the other end of which is attached a fish hook 26 carrying bait 28.

The device is set merely by stretching the elastic band 22 into engagement with the tip portion 14 of the shaft 12, as shown in FIG. 1. When a fish 30, in seizing the bait 28, pulls on the line 24, as shown in FIG. 2, the device is triggered by the elastic band 22 being released from its engagement with the tip portion 14 of the shaft 12. The jerk of the elastic band 22 in contracting toward its unstretched condition acts to quickly set the hook 26 in the fish's jaw. The elasticity of the band 22 as it is being stretched by the fish pulling away and then being contracted back toward its unstretched condition, allows for the fish to be played until retrieved by the fisherman. Furthermore, the alternate stretching and contracting of the elastic band 22 as the fish is being played transmits forces of alternating direction to the shaft 12 at the aperture 18 where the band 22 is connected to the shaft 12. These alternatingly directed forces create alternatingly directed moments around the aperture 16 where the main fishing line 20 is connected to the shaft 12, which results in a vigorous swinging of the shaft 12 backwards and forwards, pivoting around the aperture 16, between the position indicated by the solid line and the position indicated by the dotted line in FIG. 2. The device therefore not only sets the hook in the fish's jaw and allows for the fish to be played, but also acts as a readily apparent indicator to the fisherman that the fish has been hooked.

In FIGS. 5 and 6, there is shown a modified form of the shaft which can be used with the present invention. The cylindrical shaft 112 is formed with a flattened transversely enlarged head portion 113 at the opposite end thereof from the tip portion. The line connecting means is formed in the head portion 113 in the form of a lower aperture 116 for connection of the main fishing line, and an upper aperture 118 for connection of the elastic band. Having the line connecting apertures formed in the enlarged head portion rather than in the cylindrical portion of the shaft, allows for a wider transverse spacing of the apertures, resulting in a greater moment being created while the fish is being played so as to provide a more vigorous and noticeable waving of the shaft to indicate that the fish has been hooked.

The head portion 113 of the shaft 112 shown in FIGS. 5 and 6 is in the form of a tear-drop shape. A modification allowing for an even greater transverse spacing of the line connecting apertures is shown in FIG. 7. The cylindrical shaft 212 is provided with a head portion 213 formed in a tilted figure 8 shape. The head portion 213 has formed therein a lower aperture 216 for connection of the main fishing line and an upper aperture 218 for connection of the elastic band.

The tip portion of the shaft may be formed in various shapes and configurations, so long as it is designed to hold the elastic band in engagement which is sufficiently secure to prevent accidental tripping of the device, but releasable upon a tugging by a fish on the hook supporting line. Various modified forms of tip portion which can be employed on the shaft of the device of the present invention are shown in FIGS. 8, 9 and 10. In FIG. 8 is shown a shaft 312 having a bulbous shaped tip portion 314. In FIG. 9 is shown a shaft 412 having a bulbous shaped tip portion 414 similar to the tip portion 314 of FIG. 8 but provided with a notch 417 for a more secure setting of the elastic band on the tip. In FIG. 10 is shown a shaft 512 having a tapered and rounded tip portion 514 similar to the tip portion 14 of FIGS. 1 to 3 but provided with a notch 517 for a more secure setting of the elastic band on the tip.

The dimensions of the shaft and the elastic band may be varied according to the size of the fish being sought. Also, in order that the device may be utilized for night fishing and still serve to indicate to the fisherman when the fish has been hooked, the shaft may be formed of a luminous material or be provided with a luminous coating.

While in the foregoing there has been shown and described certain specific embodiments of this invention, it is to be understood that many modifications thereof are possible. The invention, therefore, is not to be restricted except insofar as is necessitated by the prior art and by the spirit of the appended claims.

What is claimed is:

1. A fish hook setting device comprising a shaft having a tip portion, first line-connecting means on the opposite end of said shaft from said tip portion, an elastic band connected to said first line-connecting means, said elastic band having an unstretched length insufficient to reach said tip portion of said shaft but being stretchable to engage said tip portion, a fish line for supporting a fish hook connected to said elastic band at its tip-engaging portion, a second line-connecting means on the opposite end of said shaft from said tip portion for connection to a main fish line, said elastic band when stretched to engage said tip portion being releasable therefrom by a pull on said fish hook supporting line, said first and second line-connecting means being axially spaced apart along said shaft, and said first line-connecting means being further removed from said tip portion than said second line-connecting means.

2. The fish hook setting device of claim 1 wherein said first and second line-connecting means comprise transverse apertures through said shaft.

3. The fish hook setting device of claim 2 wherein said shaft comprises a cylindrical portion and said apertures are circumferentially spaced apart around said cylindrical portion.

4. The fish hook setting device of claim 2 wherein said shaft includes a transversely enlarged head portion and said apertures are transversely spaced apart on said head portion.

5. The fish hook setting device of claim 4 wherein said shaft comprises a cylindrical portion and said head portion is flattened with respect to said cylindrical portion.

6. A fish hook setting device comprising a shaft having a tip portion, first line-connecting means on the opposite end of said shaft from said tip portion, an elastic band connected to said first line-connecting means, said elastic band having an unstretched length insufficient to reach said tip portion of said shaft but being stretchable to engage said tip portion, a fish line for supporting a fish hook connected to said elastic band at its tip-engaging portion, and a second line-connecting means on the opposite end of said shaft from said tip portion for connection to a main fish line, said elastic band when stretched to engage said tip portion being releasable therefrom by a pull on said fish hook supporting line, said tip portion being tapered and rounded.

7. The fish hook setting device of claim 6 wherein said tip portion is provided with a notch at its end for receiving the tip-engaging portion of said elastic band.

8. A fish hook setting device comprising a shaft having a tip portion, first line-connecting means on the opposite end of said shaft from said tip portion, an elastic band connected to said first line-connecting means, said elastic band having an unstretched length insufficient to reach said tip portion of said shaft but being stretchable to engage said tip portion, a fish line for supporting a fish hook connected to said elastic band at its tip-engaging portion, and a second line-connecting means on the opposite end of said shaft from said tip portion for connection to a main fish line, said elastic band when stretched to engage said tip portion being releasable therefrom by a pull on said fish hook supporting line, said tip portion having a bulbous shape.

9. The fish hook setting device of claim 8 wherein said tip portion is provided with a notch at its end for receiving the tip-engaging portion of said elastic band.

* * * * *